United States Patent
Chmiel et al.

(10) Patent No.: US 10,126,453 B2
(45) Date of Patent: Nov. 13, 2018

(54) PROCESSING SEISMIC DATA TO REMOTE NOISE

(71) Applicants: Malgorzata Chmiel, Grenoble (FR); Thomas Bardainne, Paris (FR); Philippe Roux, Grenoble (FR)

(72) Inventors: Malgorzata Chmiel, Grenoble (FR); Thomas Bardainne, Paris (FR); Philippe Roux, Grenoble (FR)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 390 days.

(21) Appl. No.: 14/845,355

(22) Filed: Sep. 4, 2015

(65) Prior Publication Data

US 2016/0209537 A1    Jul. 21, 2016

Related U.S. Application Data

(60) Provisional application No. 62/105,870, filed on Jan. 21, 2015.

(51) Int. Cl.
*G01V 1/48*    (2006.01)
*G01V 1/28*    (2006.01)

(52) U.S. Cl.
CPC ............... *G01V 1/48* (2013.01); *G01V 1/288* (2013.01); *G01V 2210/32* (2013.01)

(58) Field of Classification Search
CPC ......... G01V 1/30; G01V 1/38; G01V 2210/60
See application file for complete search history.

(56) References Cited

U.S. PATENT DOCUMENTS

| | | | | |
|---|---|---|---|---|
| 2004/0054479 | A1* | 3/2004 | Trickett | G01V 1/36 702/14 |
| 2013/0182532 | A1* | 7/2013 | Ferber | G01V 1/364 367/21 |

OTHER PUBLICATIONS

Riahi, "A statistical strategy for ambient seismic wavefield analysis: investigating correlations to a hydrocarbon reservoir", Geophysical Journal International (2013) 192, 148-162.*

Corciulo, "Multiscale matched-field processing for noise-source localization in exploration geophysics" Geophysics, vol. 77, No. 5 Sep.-Oct. 2012).*

(Continued)

*Primary Examiner* — Krystine E Breier
(74) *Attorney, Agent, or Firm* — Cantor Colburn LLP (57) ABSTRACT

An embodiment of a method includes receiving seismic data from an array of seismic receivers, selecting a time window, and dividing the time window into a plurality of consecutive time segments, each corresponding to a subset of the seismic data. The method also includes performing a transformation of each subset into a frequency domain subset having a total frequency band, and selecting a narrow frequency band bounded by the lowest frequency of the total band and a threshold frequency. The method further includes, for each of the plurality of frequencies in the narrow frequency band, determining a cross-spectral density matrix (CSDM) of data values in each frequency domain subset, decomposing the CSDM to generate a plurality of eigenvalues, and removing at least the most significant eigenvalue from each frequency domain subset. The method still further includes transforming each frequency domain subset into a time domain to generate de-noised seismic data.

22 Claims, 5 Drawing Sheets

(56) References Cited

OTHER PUBLICATIONS

Riahi, "A statistical strategy for ambient seismic wavefield analysis: investigating correlations to a hydrocarbon reservoir", Geophysical Journal International (2013) 192, (Year: 2013).*

Corciulo, et al., "Mutliscale matched-field processing for noise-source localization in exploration geophysics." Geophysics, vol. 77, No. 5 (Sep.-Oct. 2012). Retrieved from internet;URL:http://segdl.org, 9 pages.

Cox, Henry, "Multi-Rate Adaptive Beamforming (MRABF)"; 2000; IEEE; 4 pages.

Cros et al. "Locating hydrothermal acoustic sources at Old Faithful Geyser using Matched-Field Processing"., Geophysical Journal International 187,1; 2011; 24 pages.

Friedrich et al. "Ocean-generated microseismic noise located with the Grafenberg array", Journal of Seismology 2: 47-64, 1998 (18 pages).

Kumperman et al "Matched Field Acoustics", Mechanical Systems and Signal Processing (1997) 11(1); pp. 141-148.

Roux et al. "Increasing the accuracy of microseismic monitoring using surface patch arrays and a novel processing approach", first break vol. 32, Jul. 2014; 7 pages.

\* cited by examiner

PROCESSING SEISMIC DATA TO REMOTE NOISE

CROSS REFERENCE TO RELATED APPLICATIONS

This application claims the benefit of an earlier filing date from U.S. Provisional Application Ser. No. 62/105,870 filed Jan. 21, 2015, the entire disclosure of which is incorporated herein by reference

BACKGROUND

Hydrocarbons are typically recovered by having hydrocarbons flow out of reservoirs in a formation and into a borehole that penetrates the formation. Hydraulic fracturing and other stimulation techniques may be applied to the formation to facilitate removal of hydrocarbons by fracturing the formation and/or extending existing fractures in the formation. Seismic measurements may be used to monitor the effect of stimulation techniques on the formation, and can also be used for other purposes such as estimating properties of the formation and identifying formation layers. For example, microseismic monitoring is used to detect relatively small seismic events that can provide information such as how a formation responds to energy industry operations such as drilling, stimulation and production operations.

SUMMARY

An embodiment of a method of processing seismic data includes receiving seismic data collected from an array of seismic receivers, selecting a time window during which the array of seismic receivers detected seismic signals including signals generated by a seismic event of interest, and dividing the time window into a plurality of consecutive time segments, each time segment corresponding to a subset of the seismic data. The method also includes performing a transformation of each subset the seismic data into a frequency domain data subset having a total frequency band bounded by a lowest frequency and a highest frequency, and selecting a narrow frequency band including a plurality of frequencies, the narrow frequency band bounded by the lowest frequency and a threshold frequency that is lower than the highest frequency. The method further includes, for each of the plurality of frequencies in the narrow frequency band, determining a cross-spectral density matrix of data values in each frequency domain subset, decomposing the cross-spectral density matrix to generate a plurality of eigenvalues, and removing at least the most significant eigenvalue from each frequency domain subset. The method still further includes transforming each frequency domain subset into a time domain to generate de-noised seismic data, and identifying at least the seismic event of interest based on the de-noised seismic data.

An embodiment of a system for processing seismic data includes a processor configured to receive seismic data collected from an array of seismic receivers and perform a method including selecting a time window during which the array of seismic receivers detected seismic signals including signals generated by a seismic event of interest, and dividing the time window into a plurality of consecutive time segments, each time segment corresponding to a subset of the seismic data. The method also includes performing a transformation of each subset the seismic data into a frequency domain data subset having a total frequency band bounded by a lowest frequency and a highest frequency, and selecting a narrow frequency band including a plurality of frequencies, the narrow frequency band bounded by the lowest frequency and a threshold frequency that is lower than the highest frequency. The method further includes, for each of the plurality of frequencies in the narrow frequency band, determining a cross-spectral density matrix of data values in each frequency domain subset, decomposing the cross-spectral density matrix to generate a plurality of eigenvalues, and removing at least the most significant eigenvalue from each subset. The method still further includes transforming each frequency domain subset into a time domain to generate de-noised seismic data, and identifying at least the seismic event of interest based on the de-noised seismic data.

BRIEF DESCRIPTION OF THE DRAWINGS

The following descriptions should not be considered limiting in any way. With reference to the accompanying drawings, like elements are numbered alike.

DETAILED DESCRIPTION

There is provided a system and method for de-noising seismic data, i.e., removing unwanted signals (noise) from seismic data generated based on seismic or acoustic events occurring in an earth formation. Various sources of noise can reduce the accuracy or effectiveness of seismic measurements. Sources of noise include, for example, anthropogenic noise sources such as surface or downhole tools (e.g., pumps, drill strings and motors) used in energy industry operations, and surface vehicles. The systems and methods described herein remove or attenuate noise by processing the seismic data.

An embodiment of an algorithm and corresponding method is executed by a processor to perform a method that includes receiving seismic data from an array of receivers, selecting a portion of the seismic data corresponding to a selected time window, dividing the selected seismic data into a plurality of subsets corresponding to segments of the time window, and calculating a Fourier transform of each subset to generate a complex data vector that indicates the amplitude and phase measured by each receiver over a range of frequencies. A portion of the range of frequencies is selected for noise removal. In one embodiment, the portion of the range of frequencies is a relatively narrow frequency band at the lower end of the range of frequencies.

For each frequency (or frequency range) of the portion of the range of frequencies, a cross-spectral density matrix (CSDM) is calculated and decomposed to identify a set of eigenvalues. One or more of the highest eigenvalues are removed to generate a processed signal for each frequency. The processed signals for each frequency are combined and the combined signal is recreated in the time domain. The result is a time domain seismic data signal from which noise components are removed.

Embodiments described herein allow for suppression of coherent and incoherent noise in an automatic and efficient way. For example, methods described herein provide fast and automatic means to attenuate coherent seismic noise whose source is located at the earth surface. The methods may be performed in real time during an energy industry operation, or employed after an operation to, e.g., evaluate the effectiveness of the operation. In addition, the methods may be employed in conjunction with active and/or passive seismic operations.

Figure 1:
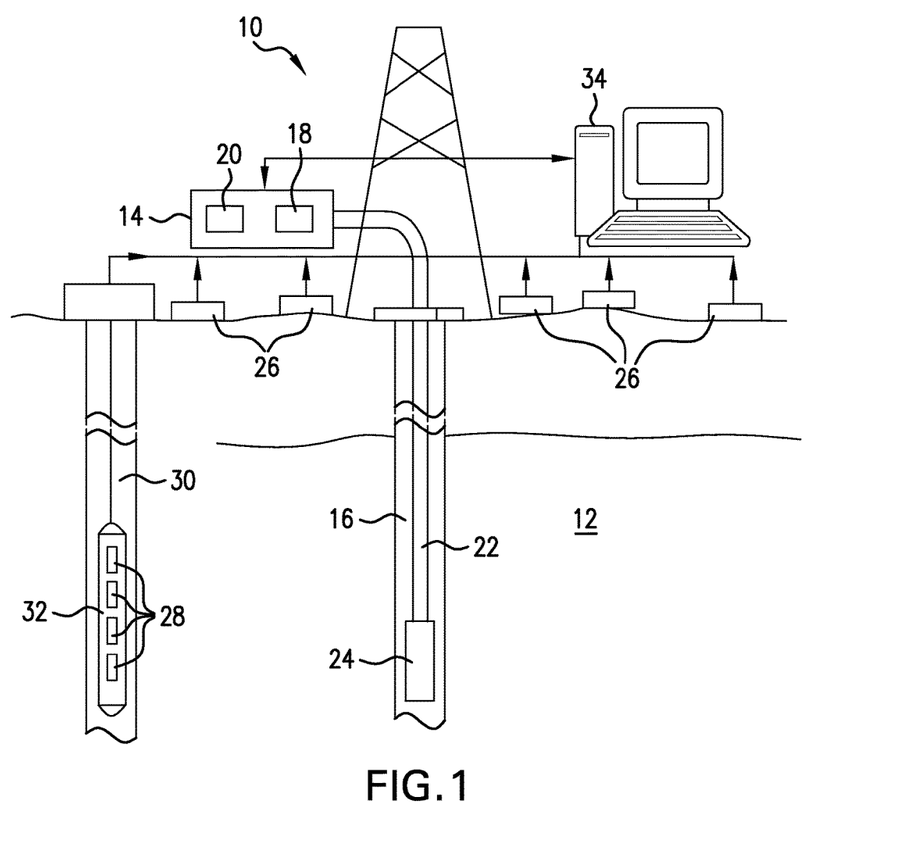
FIG. 1 depicts an embodiment of a hydrocarbon production, stimulation and/or measurement system that includes a passive seismic monitoring and/or measurement system.

FIG. 1 illustrates aspects of an embodiment of a system 10 for hydrocarbon production, stimulation and/or measurement of an earth formation 12. The system 10 includes a passive seismic monitoring and/or measurement system. The system 10 includes a stimulation treatment system 14 coupled to a borehole 16 and configured to apply a stimulation treatment to the formation 12 to facilitate production of hydrocarbons. The stimulation treatment may be any type of stimulation. In one embodiment, the stimulation treatment system 14 is configured for hydraulic fracturing, and includes one or more pumps 18 coupled to a source 20 of treatment fluid. The treatment fluid may be any flowable substance such as a liquid or a gas, and/or a flowable solid such as sand. The stimulation treatment system 14 is coupled via a borehole string 22 (e.g., coiled tubing) to a stimulation assembly 24 that includes one or more tools or components to facilitate stimulation of the formation 12, such as perforation devices, injection nozzles, mechanical valve devices such as frac sleeves and/or drop-ball devices, sensors and/or electronics assemblies.

The system 10 includes a number of surface and/or downhole seismic sensors such as geophones. For example, the system 10 includes a plurality of surface receivers 26 and/or a plurality of downhole receivers 28 disposed in the borehole 16 and/or a second borehole 30 (e.g., an offset well). A receiver may include various components such as a seismic sensor (e.g., a geophone or hydrophone) and electronics to generate a measurement signal. Although the system 10 shows both surface and downhole receivers, it is not so limited. For example, the system 10 may include only surface receivers or only downhole receivers.

The downhole receivers 28 may be deployed as or with a data acquisition tool 32, which is deployed downhole via any suitable carrier, such as a monitoring tool or sonde. In the embodiment shown in FIG. 1, the carrier includes or is connected to an armored wireline.

One or more of the stimulation system 14, the stimulation assembly 24, the tool 32, the receivers 26 and the receivers 28 may include suitable electronics or processors configured to communicate with a surface processing unit and/or control the respective component or assembly. An exemplary surface processing unit 34 is disposed in operable communication with treatment system 14 and/or stimulation assembly 24. The surface processing unit 34 is configured to receive, store and/or transmit data, and includes processing components configured to analyze data and/or control operational parameters. The surface processing unit 34 includes any number of suitable components, such as processors, memory, communication devices and power sources.

In this embodiment, the surface processing unit 34 is also coupled to a seismic monitoring and/or measurement system that includes the surface receivers 26 and/or the downhole receivers 28. The surface processing unit 34 includes components sufficient to allow the processing unit to receive and analyze data, and/or control operation of the receivers. Analysis may include processing seismic data and any other data received via measurements taken prior to, during and/or after the stimulation process. Although the system 10 includes the surface processing unit 34 for performing monitoring, analysis and control functions for both stimulation treatment and seismic monitoring, it is not so limited. For example, seismic monitoring and analysis capabilities may be embodied in a separate processor or processing unit.

In the embodiment of FIG. 1, the seismic receivers 26 and 28 are passive seismic receivers. The receivers may be configured to perform seismic surveys such as passive or "microseismic" surveys, which generally include receiving data from a receiver, locating data that exceeds some threshold, and analyzing the over-threshold data in order to determine information about certain events.

Microseismic surveying or monitoring concerns passively monitoring a formation for seismic events. In passive monitoring, the formation is not interrogated, per se, but seismic receivers are placed to receive directly any seismic waves generated by events occurring within the formation. Such events may include the seismic effects generated in a formation by fracturing, depletion, flooding, treatment, fault movement, collapse or other subterranean interventions or effects. For example, during a fracture operation, fluid and propant is pumped down a borehole at high pressure in order to generate additional fracturing within a formation zone. The propant is pumped into these fractures and maintains them after the pressure is removed. The receivers monitor seismic waves generated during and immediately after the fracture operation to provide information such as the direction, location and extent of the fractures being generated. Within a microseismic data set, seismic events are identified, each of which may have various properties such as spatial location, time, magnitude and moment tensor.

The microseismic data may be from a previous or current fracturing operation. For example, microseismic data can be received in real time and used to identify and analyze data relating to seismic events or microseismic events during a treatment operation.

Figure 2:
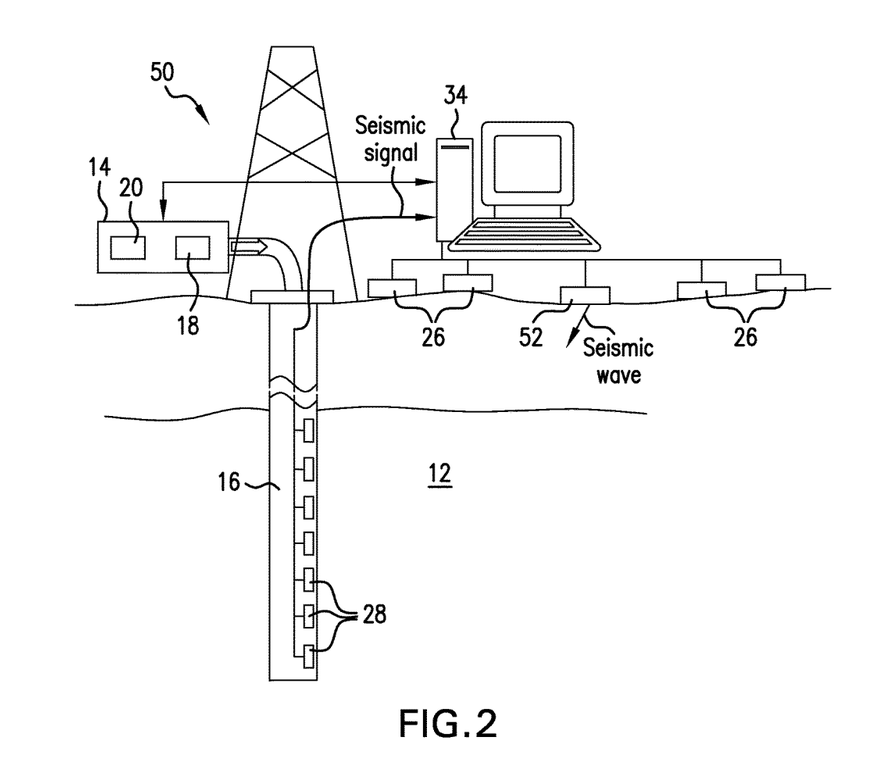
FIG. 2 depicts an embodiment of a hydrocarbon production, stimulation and/or measurement system that includes an active seismic monitoring and/or measurement system.

FIG. 2 illustrates an embodiment of a system 50 for active seismic monitoring and/or measurement. The system 50 is similar to the system 10, in that the system 50 includes the surface processing unit 34, an array of surface seismic receivers 26 and/or an array of downhole seismic receivers 28. The system 50 may also include a treatment and/or production system such as the stimulation treatment system.

The system 50 also includes one or more seismic sources 52 configured to generate a seismic wave that propagates through the earth formation 12. Seismic waves generated by the seismic source(s) are detected by the receivers and the resulting seismic data is processed and analyzed to estimate properties of the formation 12 and/or monitor operations. The seismic source(s) 52 may be disposed at a surface location as shown in FIG. 2, and/or disposed below the surface of the earth.

Various active seismic measurement operations may be performed using the system 50. For example, the system 50 is configured to perform a vertical seismic profiling (VSP) operation. The surface processing unit 34 is configured to synchronize the operation of the one or more seismic sources 52 with the receiving of seismic waves by the array of seismic receivers 28 and to receive and process seismic measurements. Using the measurements performed by the array of seismic receivers 28, the surface processing unit 34 is configured to produce seismic data by estimating seismic wave amplitude, seismic wave velocity, and/or seismic wave travel direction.

Another example of a seismic measurement is a surface seismic survey, which includes generating seismic waves by one or more sources 52, and detecting seismic waves reflected from formation features (e.g., stratigraphic layers and/or faults) by an array of surface receivers 26.

The downhole receivers 28 and other components described in the systems 10 and 50 may be lowered into a borehole using any suitable carrier, and are not limited to the embodiments described herein. The term "carrier" as used herein means any device, device component, combination of devices, media and/or member that may be used to convey, house, support or otherwise facilitate the use of another device, device component, combination of devices, media and/or member. Exemplary non-limiting carriers include casing pipes, wirelines, wireline sondes, slickline sondes, drop shots, downhole subs, BHA's, frac ports and drill strings.

A processor is configured to receive seismic data generated, for example, by the system 10 and/or 50, and perform various processing methods to remove noise and analyze the seismic data to determine properties of the formation 12. The processor may be incorporated as the surface processing unit 34 and/or another processing device or system for performing processing methods in real time during an operation In one embodiment, the processor executes an algorithm, program or set of instructions to perform a noise reduction method. The noise reduction method is used to process seismic data and attenuate seismic noise. Seismic data processed via the noise reduction method is referred to herein as "de-noised" data or signals. The method is a fast and automatic means to attenuate coherent seismic noise whose source is located at the earth surface.

Figure 3:
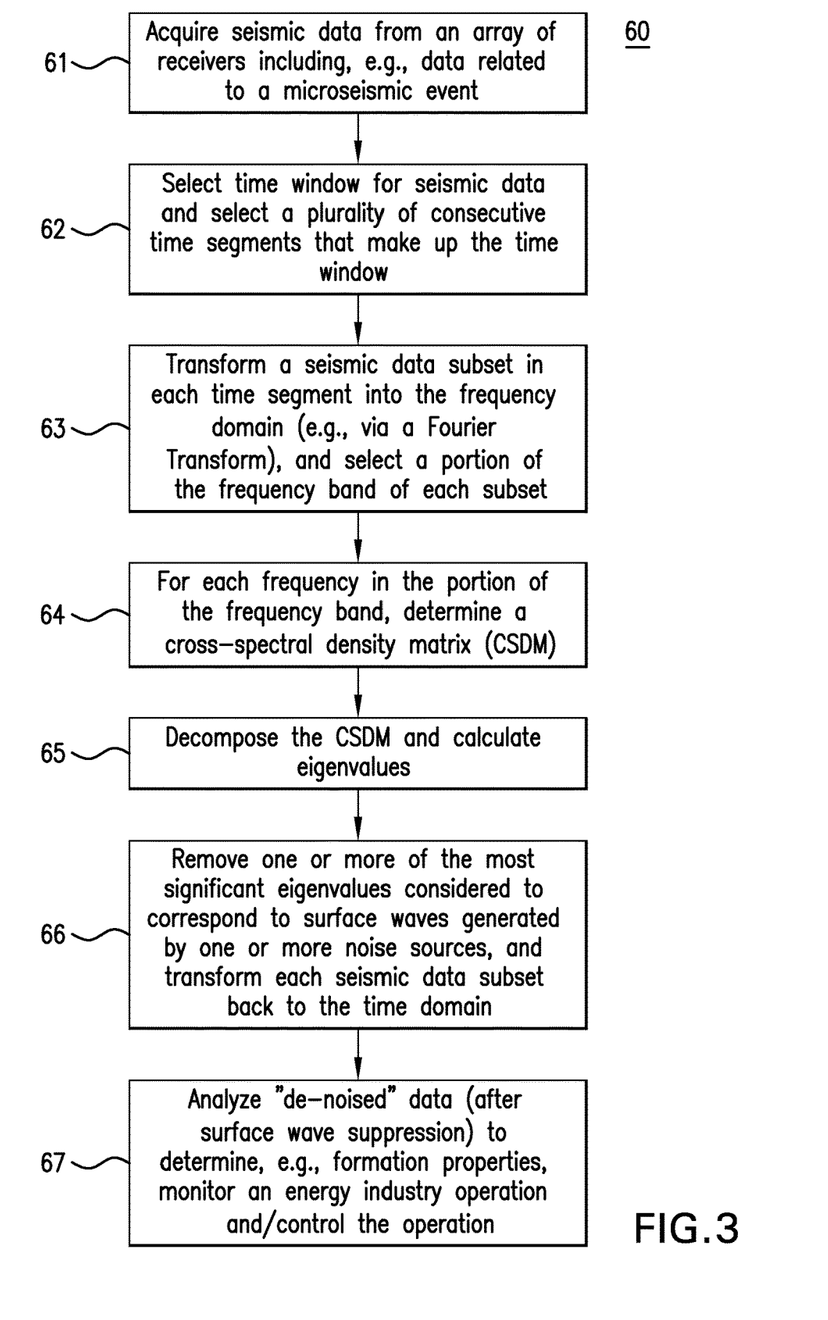
FIG. 3 is a flow chart illustrating an embodiment of a method of processing seismic data to remove noise.

FIG. 3 illustrates a method 60 for processing and/or analyzing seismic data. The method 60 includes a noise reduction and/or surface wave suppression method and may also include other methods for processing and/or analyzing seismic data including de-noised seismic data generated via the noise reduction method. The method 60 includes one or more stages 61-67. The method 60 is described herein in conjunction with a processor that receives seismic signal data related to a fracturing operation. For example, the method 60 is performed by a processor (e.g., the processing unit 34) that receives microseismic data from a seismic measurement system. In one embodiment, the stages 61-67 are performed in the order described, although some steps may be performed in a different order or one or more steps may be omitted.

In one embodiment, the method 60 is performed as specified by an algorithm that allows the processor to automatically perform data collection, noise reduction and/or analysis. The processor as described herein may be a single processor or multiple processors (e.g., a network). The method 60 may be performed in conjunction with seismic data generated by any energy industry operation. An "energy industry operation" refers to any operation or activity relating to energy sources such as hydrocarbons. Examples of energy industry operations include drilling (e.g., using a drill string or coiled tubing), reservoir navigation, surface or subsurface measurement and modeling, reservoir characterization and modeling, formation evaluation (e.g., pore pressure, lithology, fracture identification, etc.), stimulation (e.g., hydraulic fracturing, acid stimulation), completion and production.

In the first stage 61, seismic data is acquired. Seismic data generally refers to data related to detection of seismic or acoustic waves reflected or generated in an earth formation. Seismic data may be generated based on active or passive measurement regimes, such as microseismic measurements, and may be measured at surface locations or downhole locations.

For example, an energy industry operation such as a hydraulic fracturing operation is performed by the system 10. The surface processing unit 34 receives seismic data generated based on signals from the surface receivers 26 and generates time domain seismic data. Seismic waves detected by the receivers 26 include waves generated by seismic events of interest that occur in the formation 12. For example, the seismic events of interest include microseismic events occurring due to reactions in the formation in response to the stimulation. Signals generated by the receivers 26 may be contaminated by sources (referred to as "noise sources") that can produce relatively high amplitude surface seismic waves that obscure the seismic events of interest or otherwise make identification of the seismic events of interest difficult. An exemplary noise source is a surface pump for advancing treatment fluid during a stimulation operation.

In the second stage 62, a group or array of the receivers 26 are selected for processing, and a time window and corresponding seismic data from the selected receivers is selected. A "time window" is a continuous length of time during which measurement signals are generated by the selected receivers 26.

The time window is divided into a plurality of shorter time segments. The time segments, in one embodiment, are a set of consecutive equal length segments that make up the time window.

For example, temporal seismic data is generated based on signals detected by a number "N" of seismic receivers (e.g., at least three), and a portion of the seismic data corresponding to a time window "T" is chosen. The portion of the seismic data signal is divided into a plurality of subsets "m", each subset m corresponding to a time segment "t".

The total number "M" of subsets m can be expressed as:

$$M = \frac{T}{t},$$

and the time window T can be expressed as:

$$T = \Sigma_{m=1}^{M} t_m,$$

where "$t_m$," is a time segment including a corresponding subset m.

In the third stage 63, the seismic data is transformed into the frequency domain. The transformed seismic data includes a frequency band corresponding to a range of frequencies ω. Each of the frequencies ω that make up the frequency band may be a single frequency value or a relatively small frequency range.

In one embodiment, a Fourier Transform is performed on each subset m of the seismic data to generate a data set including amplitude and phase information relative to frequency. The resulting data for a subset m includes frequency data for each selected receiver 26, the frequency data including amplitude and phase at each frequency ω detected by the receiver 26.

For example, a Fourier transform is performed on the seismic data collected by the number N of receivers "n" (where n=1 . . . N). For each frequency ω, a data set such as a complex data vector $d_{m,n}$ can be generated for a segment m associated with a receiver n, which includes the amplitude and phase. The complex data vector at a given frequency ω can be represented as:

$$\vec{d}_{m=1,\ldots,M}=(d_1d_{m,1},\ldots,d_Nd_{m,N}),$$

for M segments measured by N receivers.

Next, a portion of the frequency band and the associated complex data vector are selected for surface waves suppression, e.g. noise removal. The portion of the frequency band is smaller or narrower than the overall frequency band, as is referred to herein as a "narrow band". The data associated with each frequency or frequency range ω in the narrow band is processed independently for noise removal. For example, the data set associated with a specific frequency ω includes phase and amplitude data for each receiver n at each subset m, and this data set is processed at stages 64-66 independent of data sets associated with other frequencies. Thus, stages 64-66 may be performed repeatedly for each frequency ω in the narrow band.

In one embodiment, the narrow band encompasses the lower end of the frequency band. For example, the narrow band selected for noise removal has a frequency range that is bounded by the lowest frequency of the frequency band and a selected threshold frequency that is lower than the highest frequency of the frequency band. The selected narrow band in this embodiment represents relatively low frequencies considered or expected to be produced by noise sources such as energetic, anthropogenic sources (e.g. pumps), which can conceal weaker microseismic sources. It has been discovered that lower frequency components of seismic data can be effectively de-noised without a priori information to produce data that provides useful information regarding microseismic events.

The narrow band may be selected based on various considerations, such as receiver array spacing and velocity of the medium. For example, the narrow band can have a range extending from the lowest frequency in the frequency band to about 20 Hz. It has been discovered that processing such low frequency components of seismic data as described herein, and without requiring outside data (e.g., models or other information regarding formation properties) to compare with the seismic data, provides potentially useful information regarding microseismic events. The number of sensors in these examples can vary, but in some instances is on the order of tens or hundreds of receivers arrayed on the surface and/or downhole.

In the fourth stage 64, the cross-spectral density matrix is determined for each frequency ω. The cross-spectral density matrix (CSDM) $K_m$ for each segment m can be represented as:

$$K_{m=1,\ldots,M}=\vec{d}_m\cdot\vec{d}_m^H$$

Where "H" is the Hermitian transpose of $\vec{d}_m$.

In order to separate one or more noise sources from the seismic data and from sources of interest (e.g., microseismic events), the rank of the matrix $K_m$ should be no less than the number of noise sources to be separated. For example, by construction, the $K_m$ matrix for a single segment m has a rank equal to one, as the rank of the $K_m$ matrix is equal to M. As such, individual $K_m$ matrices cannot be used to separate between noise and signal spectral characteristics. In order to increase the rank, the $K_m$ matrices for multiple segments are combined into a single CSDM (referred to as a "combined matrix"). For example, an average CSDM referred to as "K" is the arithmetic mean of a plurality of CSDMs. For a number M of segments, K can be represented as:

$$K=\frac{1}{M}\sum_{m=1}^{M}K_m.$$

In the fifth stage 65, the combined matrix is decomposed to remove one or more eigenvalues that correspond to surface waves generated by one or more noise sources. For example, decomposition is performed to remove eigenvalues corresponding to the most energetic surface waves generated by pumps or other sources.

In one embodiment, Singular Value Decomposition of the combined matrix K is performed to separate different sources. The SVD can be represented as:

$$K=U\Lambda V^H=U_p\Lambda_p V_p^H+U_{N-p}\Lambda_{N-p}V_{N-p}^H$$

where "U" and "V" are the orthonormal (N,N) eigenvector matrices and Λ is the diagonal (N,N) eigenvalue matrix. The Hermitian properties of the K matrix ($K=K^H$) implies U=V. Λ can be decomposed as the sum of two diagonal matrices as represented by:

$$\Lambda=\Lambda_p+\Lambda_{N-p}.$$

The total number of eigenvalues corresponds to the number N of receivers. "p" refers to a number of the most significant eigenvalues, which are considered to correspond to the most energetic sources of seismic signals. Thus, $\Lambda_p$ is made of the p most significant eigenvalues and $\Lambda_{N-p}$ is made of the N-p remaining eigenvalues.

In the sixth stage 66, one or more of the most significant (i.e., largest) eigenvalues are removed from the narrow band data (e.g., the complex data vector associated with each frequency ω of the narrow band). The full set of seismic data associated with the time window T is then transformed back into the time domain to reconstruct the original seismic data without the noise component(s) associated with the largest eigenvalue(s).

In one embodiment, a projector or other operator including the p eigenvalue(s) is applied to the data vector to project the eigenvalue(s) out of the data vectors of the narrow band or otherwise remove the eigenvalue(s). For example, to remove the dominant source(s), a projected signal is created by applying a projector $I-U_p V_p^\dagger$ to the portions of the data vector $\vec{d}$ corresponding to the subsets m. The resulting projected signal $\vec{z}$ can be represented as:

$$\vec{z}=[I-U_p V_p^\dagger]\cdot\vec{d},$$

where $V_p^\dagger$ is a transposed Vp, and "I" is the identity matrix.

The projected signal is calculated for all of the frequencies within the narrow frequency band selected for noise attenuation. For any other frequency outside of the narrow band, the original seismic data is retained, i.e., $\vec{z}=\vec{d}$.

The full frequency domain signal is then transformed back to the time domain by, e.g., performing an inverse Fourier transform, to generate de-noised data.

In the seventh stage 67, parameters are determined based on the de-noised data. For example, the de-noised data is further processed and/or analyzed to estimate properties of the formation, for example, by identifying seismic reflectors associated with formation layers, or analyzing seismic data to estimate mechanical rock properties and/or fluid properties. In another example, the seismic data is analyzed to identify the amplitude and location of microseismic events to evaluate fracture creation and movement, which can be utilized to evaluate production and stimulation effectiveness.

The seismic data can also be used to control parameters of an operation based on detection of microseismic or other seismic events.

An example of seismic data and aspects of the method 60 are discussed in conjunction with FIG. 3. A plurality of receivers is arrayed on a surface region above a formation, reservoir or other volume of interest. Seismic data acquired by a group or "patch" of receivers is selected for noise removal. In this example, 47 receivers (N=47) are selected and seismic signals are recorded over a thirty second time window are divided into ten equal consecutive segments (M=10) of three seconds each.

The segments are transformed into the frequency domain, and a complex data vector including phase and amplitude from each receiver is generated for each frequency ω of a range of frequencies based on the transform. The CSDM of the data vector is calculated for a narrower range of frequencies, and the CSDM is decomposed to identify the eigenvalues.

FIG. 3 shows a distribution of eigenvalues 70 and 72 calculated at a frequency of about 2 Hz. This distribution allows distinguishing between noise sources and the microseismic signal without a priori information. The distribution of the eigenvalues 70 and 72 clearly shows the rank of the CSDM, which in this example is ten. The eigenvalues higher than the rank of the CSDM constitute a plateau of the distribution.

In this example, at least the first two eigenvalues 72 correspond to the most stable surface noise sources, so p is equal to or greater than two. The remaining N-p eigenvalues 70 are considered to potentially include an actual microseismic signal, and thus are not removed.

The p value may be selected to be greater than two if desired. Generally, the lower the p value, the safer the method 60 is in terms of signal preservation. However, lower p values may correspond to a lower effectiveness in terms of noise reduction.

The systems and methods described herein provide various advantages over existing techniques. The methods allow for suppressing coherent and incoherent noise in an automatic and efficient way. In addition, no a priori information regarding the formation such as models (e.g., forward models) is needed, nor is any such a priori information used, to remove noise according to the embodiments described herein. Also, the embodiments described herein broaden the frequency band of seismic signals that can be de-noised without such a priori information, e.g., by including lower frequencies. In cases of microseismic monitoring, the embodiments lower the number of false events detected.

Figure 4:
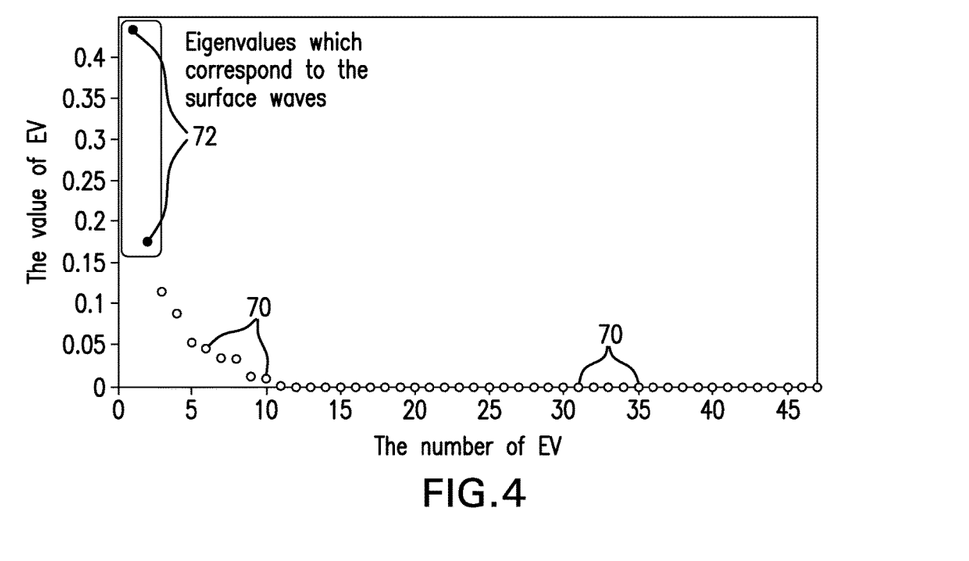
FIG. 4 depicts exemplary eigenvalues calculated as part of an embodiment of the method of FIG. 3.
Figure 5:
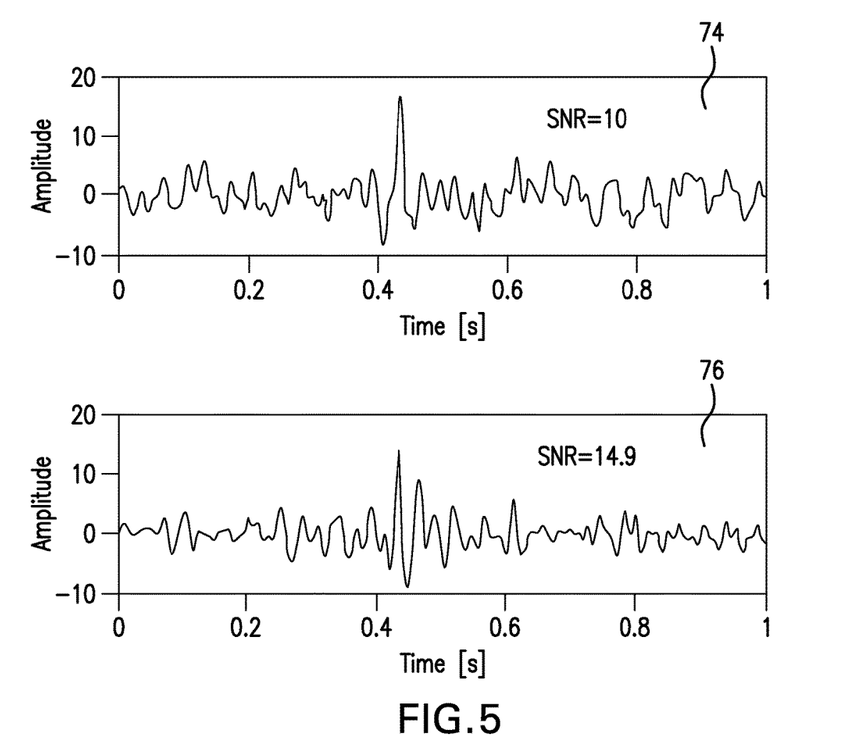
FIG. 5 depicts exemplary seismic data before and after noise removal according to embodiments of the method of FIG. 3.

Furthermore, the embodiments described herein increase the signal to noise ratio (SNR) of seismic data. An example of this increase is shown in FIG. 4, which illustrates a data set 74 showing a stack of a microseismic signal before de-noising, and a data set 76 showing the stack after de-noising. In both cases data was filtered in a frequency band of 2-50 Hz. A time window of one second was chosen for de-noising, and the number of eigenvalues removed was one. The SNR was calculated as the root mean square amplitude ratio between signal and noise. De-noising according to embodiments described herein increased SNR by almost 50%.

Generally, some of the teachings herein are reduced to an algorithm that is stored on machine-readable media. The algorithm is implemented by a computer or processor such as the processing unit 34 and provides operators with desired output.

In support of the teachings herein, various analysis components may be used, including digital and/or analog systems. The devices, systems and methods described herein may be implemented in software, firmware, hardware or any combination thereof. The devices may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the devices and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. The computer executable instructions may be included as part of a computer system or provided separately.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of processing seismic data, the method comprising:
receiving seismic data collected from an array of seismic receivers;
selecting a time window during which the array of seismic receivers detected seismic signals including signals generated by a seismic event of interest, and dividing the time window into a plurality of consecutive time segments, each time segment corresponding to a subset of the seismic data;
performing a transformation of each subset the seismic data into a frequency domain data subset having a total frequency band bounded by a lowest frequency and a highest frequency;
selecting a narrow frequency band including a plurality of frequencies, the narrow frequency band bounded by the lowest frequency and a threshold frequency that is lower than the highest frequency;
for each of the plurality of frequencies in the narrow frequency band, determining a cross-spectral density matrix of data values in each frequency domain subset, decomposing the cross-spectral density matrix to generate a plurality of eigenvalues, and removing at least the most significant eigenvalue from each frequency domain subset;

transforming each frequency domain subset into a time domain to generate de-noised seismic data; and identifying at least the seismic event of interest based on the de-noised seismic data, wherein the determining, decomposing and removing at least the most significant eigenvalue are performed without comparing the seismic data to any a priori information regarding properties of the formation.

2. The method of claim 1, further comprising controlling an energy industry operation based on identifying at least the seismic event of interest.

3. The method of claim 2, wherein the energy industry operation is selected from at least one of a stimulation operation and a production operation.

4. The method of claim 1, wherein the seismic event of interest is a microseismic event, and the most significant eigenvalue corresponds to a surface noise source that generates surface seismic waves having amplitudes that are greater than seismic waves generated by the microseismic event.

5. The method of claim 1, wherein the threshold frequency is less than 5 Hz.

6. The method of claim 1, wherein the lowest frequency is about 1 Hz and the threshold frequency is 15 Hz.

7. The method of claim 1, wherein a portion of the frequency domain subset for a frequency $\omega$ in the narrow band is a complex data vector $\vec{d}_m$ that includes an amplitude ($d_n$) and a phase ($d_{m,n}$) of a portion of each frequency domain segment associated with a receiver n, the complex data vector $\vec{d}_m$ represented by the following equation:

$$\vec{d}_{m=1,\ldots,M} = (d_1 d_{m,1}, \ldots, d_N d_{m,N}),$$

wherein m is one of the frequency domain segments, M is a number of the frequency domain segments m, and N is a number of the receivers making up the array.

8. The method of claim 1, wherein the cross-spectral density matrix has a rank equal to M, wherein the rank is greater than a number of noise sources to be removed from the seismic data.

9. The method of claim 8, wherein decomposing includes performing single value decomposition of the cross-spectral density matrix.

10. A system for processing seismic data, the system comprising:

a processor configured to receive seismic data collected from an array of seismic receivers, the processor configured to perform a method including:

selecting a time window during which the array of seismic receivers detected seismic signals including signals generated by a seismic event of interest, and dividing the time window into a plurality of consecutive time segments, each time segment corresponding to a subset of the seismic data;

performing a transformation of each subset the seismic data into a frequency domain data subset having a total frequency band bounded by a lowest frequency and a highest frequency;

selecting a narrow frequency band including a plurality of frequencies, the narrow frequency band bounded by the lowest frequency and a threshold frequency that is lower than the highest frequency;

for each of the plurality of frequencies in the narrow frequency band, determining a cross-spectral density matrix of data values in each frequency domain subset, decomposing the cross-spectral density matrix to generate a plurality of eigenvalues, and removing at least the most significant eigenvalue from each subset;

transforming each frequency domain subset into a time domain to generate de-noised seismic data; and identifying at least the seismic event of interest based on the de-noised seismic data, wherein the determining, decomposing and removing at least the most significant eigenvalue are performed without comparing the seismic data to any priori information regarding properties of the formation.

11. The system of claim 10, wherein the method further includes controlling an energy industry operation based on identifying at least the seismic event of interest.

12. The system of claim 11, wherein the energy industry operation is selected from at least one of a stimulation operation and a production operation.

13. The system of claim 10, wherein the seismic event of interest is a microseismic event, and the most significant eigenvalue corresponds to a surface noise source that generates surface seismic waves having amplitudes that are greater than seismic waves generated by the microseismic event.

14. The system of claim 10, wherein the threshold frequency is less than 5 Hz.

15. The system of claim 10, wherein the lowest frequency is about 1 Hz and the threshold frequency is 15 Hz.

16. The system of claim 10, wherein a portion of the frequency domain subset for a frequency $\omega$ in the narrow band is a complex data vector $\vec{d}_m$ that includes an amplitude ($d_n$) and a phase ($d_{m,n}$) of a portion of each frequency domain segment associated with a receiver n, the complex data vector $\vec{d}_m$ represented by the following equation:

$$\vec{d}_{m=1,\ldots,M} = (d_1 d_{m,1}, \ldots, d_N d_{m,N}),$$

wherein m is one of the frequency domain segments, M is a number of the frequency domain segments m, and N is a number of the receivers making up the array.

17. The system of claim 10, wherein the cross-spectral density matrix has a rank equal to M, wherein the rank is greater than a number of noise sources to be removed from the seismic data.

18. The system of claim 17, wherein decomposing includes performing single value decomposition of the cross-spectral density matrix.

19. A method of processing seismic data, the method comprising:

receiving seismic data collected from an array of seismic receivers;

selecting a time window during which the array of seismic receivers detected seismic signals including signals generated by a seismic event of interest, and dividing the time window into a plurality of consecutive time segments, each time segment corresponding to a subset of the seismic data;

performing a transformation of each subset the seismic data into a frequency domain data subset having a total frequency band bounded by a lowest frequency and a highest frequency;

selecting a narrow frequency band including a plurality of frequencies, the narrow frequency band bounded by the lowest frequency and a threshold frequency that is lower than the highest frequency;

for each of the plurality of frequencies in the narrow frequency band, determining a cross-spectral density matrix of data values in each frequency domain subset, decomposing the cross-spectral density matrix to generate a plurality of eigenvalues, and removing at least the most significant eigenvalue from each frequency domain subset;

transforming each frequency domain subset into a time domain to generate de-noised seismic data; and identifying at least the seismic event of interest based on the de-noised seismic data, wherein a portion of the frequency domain subset for a frequency w in the narrow band is a complex data vector $\vec{d}_m$ that includes an amplitude ($d_n$) and a phase ($d_{m,n}$) of a portion of each frequency domain segment associated with a receiver n, the complex data vector $\vec{d}_m$ represented by the following equation:

$$\vec{d}_{m=1,\ldots,M} = (d_1 d_{m,1}, \ldots, d_N d_{m,N}),$$

wherein m is one of the frequency domain segments, M is a number of the frequency domain segments m, and N is a number of the receivers making up the array.

20. A method of processing seismic data, the method comprising:

receiving seismic data collected from an array of seismic receivers;

selecting a time window during which the array of seismic receivers detected seismic signals including signals generated by a seismic event of interest, and dividing the time window into a plurality of consecutive time segments, each time segment corresponding to a subset of the seismic data;

performing a transformation of each subset the seismic data into a frequency domain data subset having a total frequency band bounded by a lowest frequency and a highest frequency;

selecting a narrow frequency band including a plurality of frequencies, the narrow frequency band bounded by the lowest frequency and a threshold frequency that is lower than the highest frequency;

for each of the plurality of frequencies in the narrow frequency band, determining a cross-spectral density matrix of data values in each frequency domain subset, decomposing the cross-spectral density matrix to generate a plurality of eigenvalues, and removing at least the most significant eigenvalue from each frequency domain subset;

transforming each frequency domain subset into a time domain to generate de-noised seismic data; and identifying at least the seismic event of interest based on the de-noised seismic data, wherein the cross-spectral density matrix has a rank equal to M, wherein the rank is greater than a number of noise sources to be removed from the seismic data.

21. A system for processing seismic data, the system comprising:

a processor configured to receive seismic data collected from an array of seismic receivers, the processor configured to perform a method including:

selecting a time window during which the array of seismic receivers detected seismic signals including signals generated by a seismic event of interest, and dividing the time window into a plurality of consecutive time segments, each time segment corresponding to a subset of the seismic data;

performing a transformation of each subset the seismic data into a frequency domain data subset having a total frequency band bounded by a lowest frequency and a highest frequency;

selecting a narrow frequency band including a plurality of frequencies, the narrow frequency band bounded by the lowest frequency and a threshold frequency that is lower than the highest frequency;

for each of the plurality of frequencies in the narrow frequency band, determining a cross-spectral density matrix of data values in each frequency domain subset, decomposing the cross-spectral density matrix to generate a plurality of eigenvalues, and removing at least the most significant eigenvalue from each subset;

transforming each frequency domain subset into a time domain to generate de-noised seismic data; and identifying at least the seismic event of interest based on the de-noised seismic data, wherein a portion of the frequency domain subset for a frequency w in the narrow band is a complex data vector $\vec{d}_m$ that includes an amplitude ($d_n$) and a phase ($d_{m,n}$) of a portion of each frequency domain segment associated with a receiver n, the complex data vector $\vec{d}_m$ represented by the following equation:

$$\vec{d}_{m=1,\ldots,M} = (d_1 d_{m,1}, \ldots, d_N d_{m,N}),$$

wherein m is one of the frequency domain segments, M is a number of the frequency domain segments m, and N is a number of the receivers making up the array.

22. A system for processing seismic data, the system comprising:

a processor configured to receive seismic data collected from an array of seismic receivers, the processor configured to perform a method including:

selecting a time window during which the array of seismic receivers detected seismic signals including signals generated by a seismic event of interest, and dividing the time window into a plurality of consecutive time segments, each time segment corresponding to a subset of the seismic data;

performing a transformation of each subset the seismic data into a frequency domain data subset having a total frequency band bounded by a lowest frequency and a highest frequency;

selecting a narrow frequency band including a plurality of frequencies, the narrow frequency band bounded by the lowest frequency and a threshold frequency that is lower than the highest frequency;

for each of the plurality of frequencies in the narrow frequency band, determining a cross-spectral density matrix of data values in each frequency domain subset, decomposing the cross-spectral density matrix to generate a plurality of eigenvalues, and removing at least the most significant eigenvalue from each subset;

transforming each frequency domain subset into a time domain to generate de-noised seismic data; and identifying at least the seismic event of interest based on the de-noised seismic data, wherein the cross-spectral density matrix has a rank equal to M, wherein the rank is greater than a number of noise sources to be removed from the seismic data.

* * * * *